United States Patent [19]

Seabourn et al.

[11] Patent Number: 5,085,283
[45] Date of Patent: Feb. 4, 1992

[54] METHOD AND TOOL STRING FOR CURVING A VERTICAL BOREHOLE HORIZONTALLY

[76] Inventors: Ed O. Seabourn, 1928 N. McKinley; William R. Ericksen, Box 1100, both of Hobbs, N. Mex. 88240

[21] Appl. No.: 578,980

[22] Filed: Sep. 7, 1990

[51] Int. Cl.⁵ .................. E21B 7/08; E21B 17/20; E21B 17/22
[52] U.S. Cl. .................... 175/61; 175/79; 175/323; 138/133
[58] Field of Search ............... 175/79, 61, 62, 81, 175/82, 78, 77, 73, 323, 320, 215; 138/133, 138

[56] References Cited

U.S. PATENT DOCUMENTS

| | | | |
|---|---|---|---|
| 3,167,126 | 1/1965 | Reineke, Jr. et al. | 138/133 X |
| 3,234,723 | 2/1966 | Brown | 138/133 X |
| 3,320,665 | 5/1967 | Morse | 138/133 X |
| 3,559,693 | 4/1968 | Reynard | 138/133 |
| 3,610,346 | 10/1971 | Ziober | 175/61 X |
| 4,099,425 | 7/1978 | Moore | 138/133 X |
| 4,402,551 | 9/1983 | Wood et al. | 175/61 X |
| 4,905,777 | 3/1990 | Spies | 175/78 X |

Primary Examiner—Stephen J. Novosad
Attorney, Agent, or Firm—Marcus L. Bates

[57] ABSTRACT

A flexible drill string for curving a vertical borehole laterally towards the horizontal, comprising an elongated flexible casing made of a plurality of sections with each section having a longitudinal central axis. Each section is attached to an adjacent section such that the casing string can conform to a segment of a curve. An elongated flexible drilling string is rotatably received within the flexible casing and an annulus is formed between the casing and drill string. The drill string has a central fluid passageway of resilient material surrounded by a plurality of longitudinally extending bendable members that jointly encapsulate the central fluid passageway and forms an outer housing about the drill string. The drill string central passageway is an elastomeric conduit and the plurality of bendable members are placed circumferentially thereabout and are connected together to form the housing. The elongate bendable members are individual cables spaced an equal radial distance from the longitudinal axis of the passageway, and a connector affixed at each end of the cables enables the string to be connected into a tool string.

13 Claims, 2 Drawing Sheets

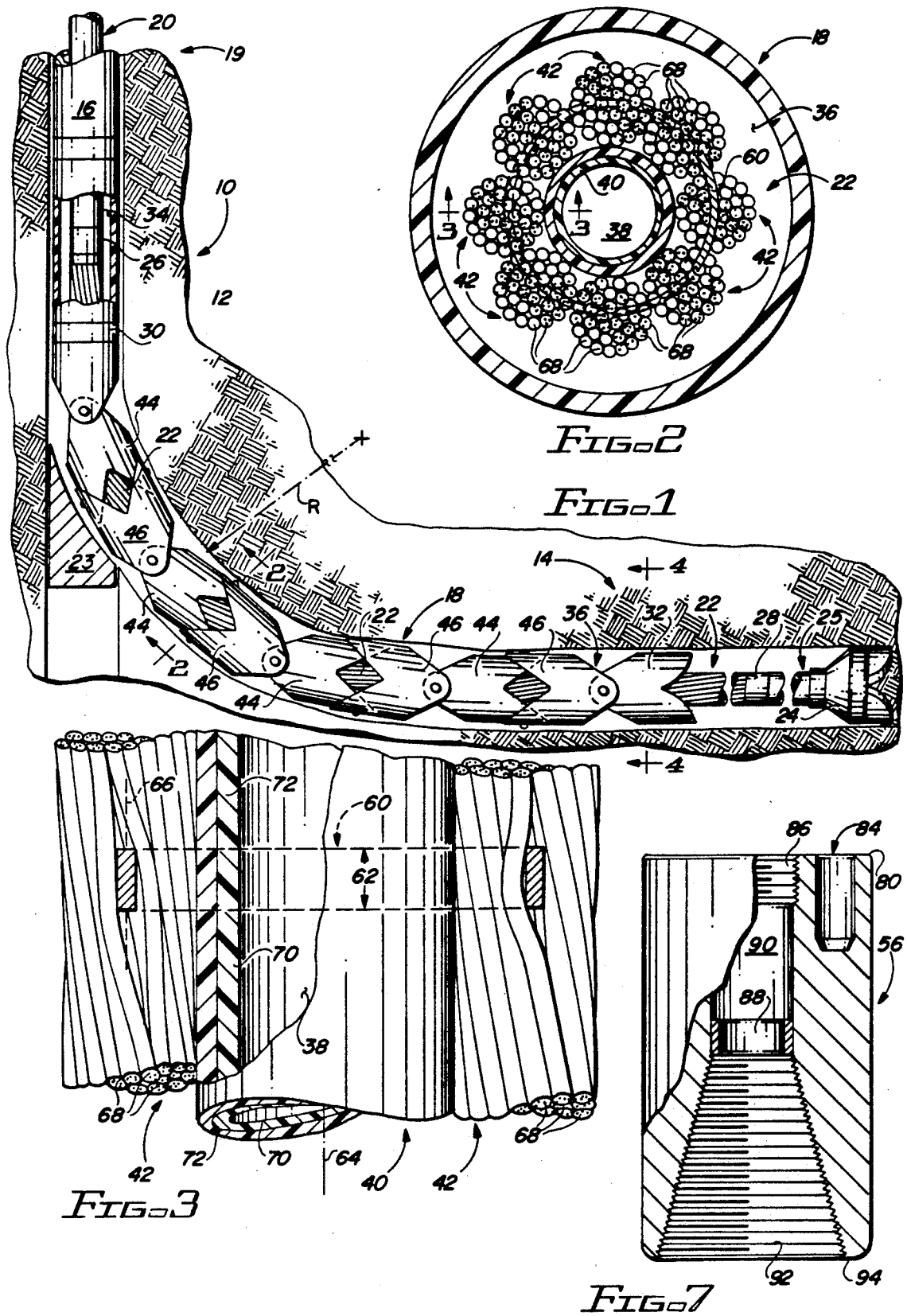

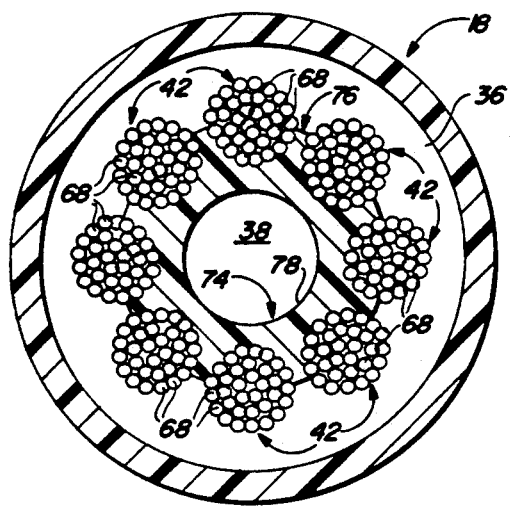
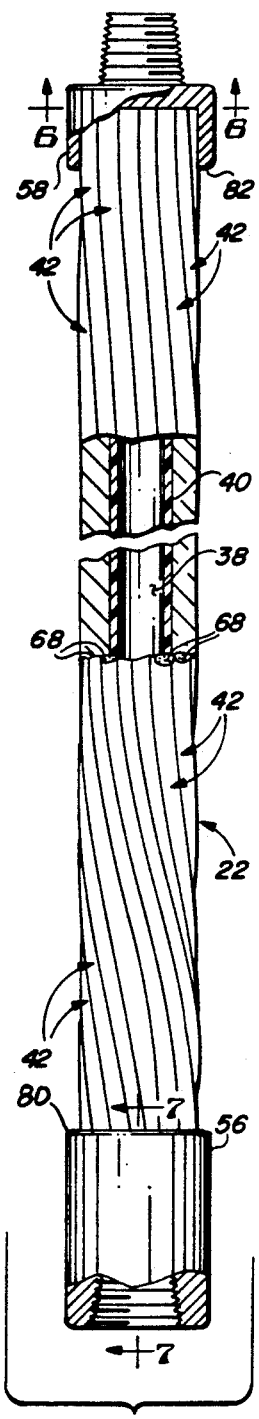
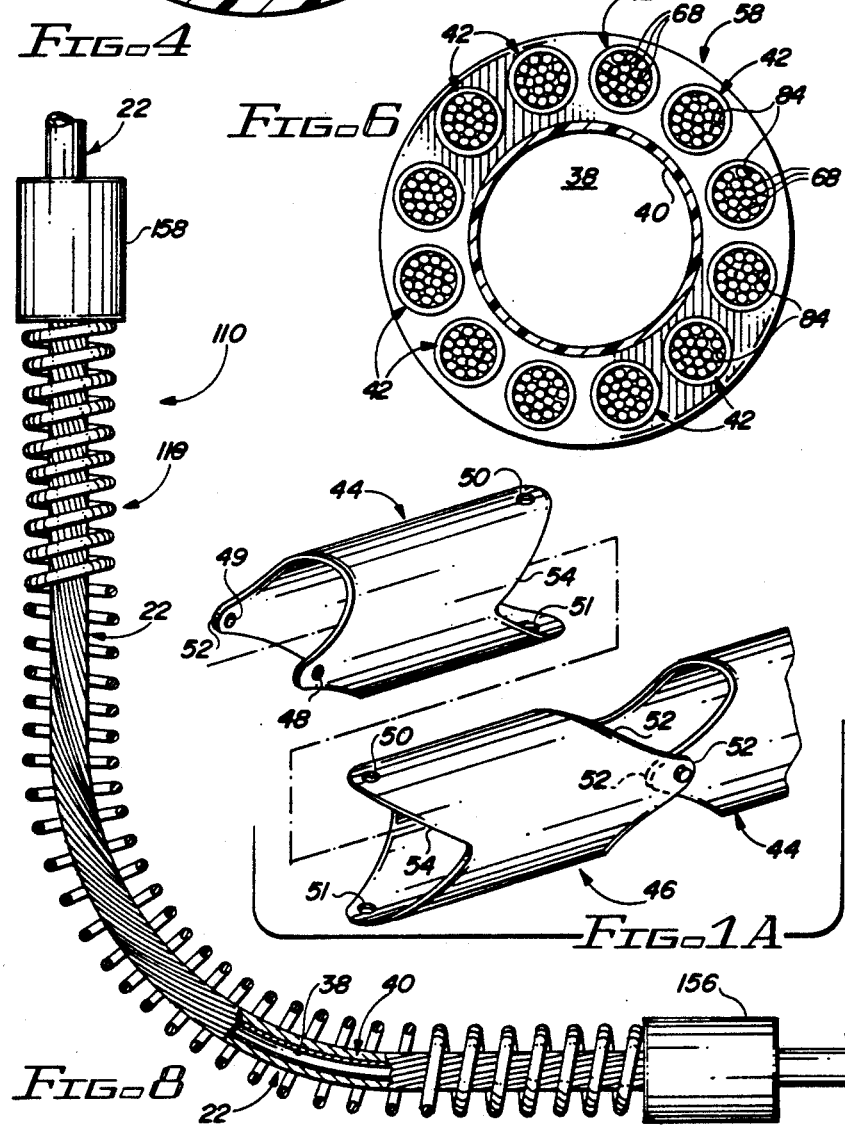

METHOD AND TOOL STRING FOR CURVING A VERTICAL BOREHOLE HORIZONTALLY

BACKGROUND OF THE INVENTION

For many years it has been known to drill horizontally through a pay zone in order to expose a large area of the production formation to the wellbore and thereby vastly increase the production rate of the well. It is known to slant a borehole by using a whip-stock in order to offset the well using a conventional drill string; however, it is difficult to enter a thin hydrocarbon bearing formation using this technique.

It is desirable to be able to drill a lateral from a vertical borehole at a precise location that assures the lateral penetrating the production formation. This is difficult to achieve, especially with thin or irregular formations.

Accordingly, after a well has been geologized, and the payzone precisely located, the formation of a lateral borehole that extends from the vertical at the precise location required to intercept and penetrate the payzone is more likely to be made possible if an unusually small radius of curvature can be effected into the drill string and casing.

Method and apparatus for achieving the above desirable goals is believed to be possible by the provision of a flexible drill string that does not require a downhole motor driven bit; that can make a sharp bend to turn the borehole laterally and thereafter continue to drill while being rotated by a rotary turn table of a drilling rig; and such a method and apparatus is the subject of the present invention.

SUMMARY OF THE INVENTION

The present invention provides a flexible drill string apparatus for curving a vertical borehole laterally towards the horizontal, so that a production zone can accurately be intercepted by a drill bit, thereby forming a borehole having a vertical length that extends down into the earth and then abruptly deviates from the vertical and curves towards the horizontal. The apparatus comprises an elongated flexible guide means in the form or a casing string that can be made to conform to a segment or a small radius curve. An elongated flexible drilling string is rotatably received within the flexible casing. While the casing forms a curved guide means for the drill string, it can also be made with an annulus formed between the casing and drill string, if desired.

The flexible drilling string has a central fluid conveying passageway, preferably made of a flexible material that is surrounded by a housing made of a plurality of longitudinally extending bendable members that jointly encapsulate the central fluid passageway and forms an outer housing about the central passageway of the drill string. The central passageway is a reinforced elastomeric conduit and the plurality of elongated, bendable members are circumferentially arranged thereabout and are connected together to form a novel unitary but bendable housing about the flow conduit.

In one form of the invention the elongated members that form the drill string outer housing are individual cables spaced equidistant radially from the longitudinal central axis of the central flow passageway and includes means by which the adjacent cables are connected together, and thereby form a protective housing for the flow conduit as well as transmitting a rotating force into the bit.

The flexible casing is made of at least one section, and can be made into a plurality of series connected sections, with each section having a common longitudinal central axis that can be deformed into a curve. Each section is suitably attached to an adjacent section such that the casing can have the dual purpose of guiding the bit at the terminal end of the drill string as well as holding the formation in place.

Accordingly, a primary object of the present invention is the provision of method and apparatus by which a lateral borehole can be connected to a vertical borehole with a short radius of curvature therebetween.

Another object of the present invention is the provision of a combination flexible casing and flexible drill string for drilling a lateral part of a borehole from a vertical part of a borehole.

A further object of this invention is the provision of a flexible casing for use in drilling a lateral borehole from a vertical borehole wherein the casing serves as a guide means during the drilling operation and can be left downhole as part of the production equipment.

A still further object of this invention is the provision of a flexible drill string having an axial passageway housed within a plurality of elongated members that are connected to one another and circumferentially extend about the passageway.

Another and still further object of this invention is the provision of a flexible drill string that does not require a downhole motor for driving the bit; the flexible drill string being made of a plurality of longitudinally extending, circumferentially arranged cables having opposed ends attached to connectors by which the string can be connected into a tool string and thereby drill a sharp bend in the borehole.

Still another and further object of this invention is the provision of a flexible drill string made of a plurality of longitudinally extending, parallel arranged, elongated members connected to one another and circumferentially arranged about a central conduit and having opposed ends attached to connectors by which the string can be connected into a tool string which can drill while turning the borehole laterally and thereafter continue to drill while being rotated by a rotary turn table of a drilling rig; and thereby form a shape bend in the borehole.

These and other objects and advantages of the present invention will become readily apparent to those skilled in the art upon reading the following detailed description and claims and by referring to the accompanying drawings.

The above objects are attained in accordance with the present invention by the provision of apparatus fabricated in a manner substantially as described herein.

BRIEF DESCRIPTION OF THE DRAWINGS

FIG. 1 is a part diagrammatically, part schematical, part cross-sectional view showing a wellbore that has been formed according to the method of this invention and having apparatus made in accordance with the present invention associated therewith;

FIG. 1A is a disassembled view of some of the apparatus disclosed in FIG. 1;

FIG. 2 is an enlarged, cross-sectional view taken along lines 2—2 of FIG. 1;

FIG. 3 is an enlarged, cross-sectional view taken along lines 3—3 of FIG. 2;

FIG. 4 is a cross-sectional view similar to FIG. 2 and showing a modification thereof;

FIG. 5 is a part cross-sectional, side view of some of the apparatus disclosed in FIG. 1, with some parts being broken away therefrom and shown in cross-section;

FIG. 6 is an enlarged, detailed, part cross-sectional, view taken along line 6—6 of the apparatus disclosed in FIG. 5;

FIG. 7 is an enlarged, part cross-sectional view taken along line 7—7 of part of the apparatus disclosed in FIG. 5; and, FIG. 8 is a side elevational view of another embodiment of the present invention, with some parts being shown broken away and in cross-section to better disclose some of the details thereof.

DETAILED DESCRIPTION OF THE PREFERRED EMBODIMENTS

FIG. 1 discloses both method and apparatus for forming a borehole 10 in accordance with the present invention. FIG. 1, together with other figures of the drawings, illustrates a crooked borehole 10 having a vertical upper length 12 and a lower lateral length 14 connected thereto along the curved interconnecting part of the borehole indicated by radius R. The upper length 12 seldom is absolutely vertical and the lower lateral length 14 thereof can extend from length 12 at any desired angle, usually horizontally as shown.

An upper rigid casing 16, of prior art design, is located in the vertical part 12 of the borehole 10 and extends downhole adjacent to the curved part R of the borehole where it is connected to one end of a flexible guide means or casing 18 made in accordance with the present invention. The flexible casing 18 can be forced to move further along and into the borehole by techniques employed by the operators of a drilling rig 19 (not shown) as hole is made.

A rigid or upper drill string 20, which can take on any number of different forms, is positioned within casing 16 in the usual manner and can be manipulated by any suitable apparatus associated with the drilling rig (not shown). The rigid drill string 20 extends down the vertical length of the borehole adjacent to the curved part R where the lower end thereof is attached to the upper end of a flexible or lower drill string 22 made in accordance with this invention. Numeral 23 is any known means for diverting the angle of the hole from vertical to horizontal. Such an apparatus is usually referred to as a whipstock; and, U.S. Pat. No. 2,726,847 to McCune et al and U.S. Pat. No. 3,398,804 to Holbert are examples.

A bit 24 of suitable configuration is optionally connected to a short stabilizer 25 which can be connected to the lower terminal end of the flexible drill string 22 for rotation thereof. The upper end of the flexible drill string 22 is connected to the lower end of rigid drill string 20 by means of connector 26. The stabilizer 25 is connected to the lower end of flexible drill string 22 by means of connector 28. Connector 30 interconnects upper casing string 16 with the upper end of the flexible lower casing string 18. Numeral 32 indicates the lower terminal end of the lower casing string 18, which also forms a guide means as well as an outer flexible casing for use in conjunction with this invention.

Annulus 34 is formed between casing 16 and drill string 20. Annulus 36 is formed between the outer flexible housing 18 and the flexible drill string 22. Annulus 36 is a continuation of annulus 34.

In FIG. 2, together with other figures of the drawings, there is disclosed a cross-sectional representation of the preferred embodiment of this invention. As particularly seen illustrated in FIG. 2, an axial fluid flow passageway 38 extends longitudinally through which fluid can flow from the surface down to the bit face and back up through the annulus 34 and 36, to the surface of the ground; or vise versa.

In FIG. 2, numeral 40 represents a flexible, inner, reinforced elastomeric flow conduit of commercial design adapted to withstand considerable internal pressure, such as, for example, a heavy duty hose reinforced with several plies of fabric material. A plurality of circumferentially extending elongated members 42 circumferentially extend about the exterior of conduit 40 and preferably are place closely adjacent to one another and in attached relationship respective to one another, thereby forming a flexible indestructible outer housing for use as part of the flexible drill string 22.

The elongated members 42 preferably are identical multi-stranded commercially available cables, or wire rope, having opposed ends suitably connected to receive rotational power at connector 26 and to transmit the rotational power to the drill bit 24. Stated differently, the drilling rig 19 manipulates and rotates the upper string 20, which motion is transmitted to the bit 24 by means of the lower string 22, made in accordance with this invention.

In FIGS. 1 and 1A, the rigid segments 44 and 46 of flexible casing 18 are comprised of identical members, each having similar ends fastened to one another at 48, 49 and 50, 51. Like ends 52 of adjacent sections are fastened to one another while like ends 54 of other adjacent sections are fastened to one another. This provides a guide means and casing that can negotiate an unusually sharp curve of very small radius R.

In the cross-sectional views of FIGS. 2, 3, 4 and 6, the elongated members 42 are radially spaced from the longitudinal axial centerline of the drill string 22, and the axis thereof lays along a common circle. The individual members 42 are attached together to form a cylindrical enclosure or housing about flexible conduit 40. Thus, the members 42 capture and thereby restrain and greatly reinforce the conduit 40, whereby the working pressure thereof is greatly incresed well beyond its normal bursting strength.

As seen in FIGS. 2, 3, 4, 5 and 6, the elongate members 42 are illustrated as being in the form of individual lengths of wire rope or cables 42 and are attached to one another by the illustrated circumferentially extending anchor means, shown herein in FIGS. 2 and 3 as spaced metal bands 60 having a width 62 of about an inch, and placed on one foot intervals. The band 60 is continuous and extends through the central axis of each of the cables. As seen in FIG. 3, numeral 64 indicates the longitudinal axial centerline of the flow conduit 40, while numeral 66 indicates the central axis of each of the cables 42. The axis 64 and 66 are normally but not necessarily always parallel to one another. Numeral 68 indicates the multiplicity of individual small strands of wire that make up the larger individual wire rope members 42. In FIG. 3, numeral 70 indicates the inner reinforcement ply of flow conduit 40 while outer ply 72 is captured within and adjacent to the housing formed by the coacting cables 42.

In the embodiment of FIG. 4, together with other figures of the drawings, the longitudinally extending, circumferentially arranged members 42 are seen to be vulcanized together by a suitable elastomer 74, with the elastomer preferably being extruded into the interior of the cables 42 and thereby anchoring the cables to one another as suggested by the numeral 76, and thereby forming interior wall surface 78 for formation of flow passageway 38.

In FIGS. 2 and 3, a small wire rope can alternatively be used for the anchor means at 60. The small wire rope extends through the central axis of the individual cables 42 and thereby circumscribes the assembly in a spiral-like manner to suitably tie or closely anchor the cables together at one inch pitch of the spiral, for example. The small wire rope 60 can be one-fourth the diameter of the wire rope 42, for example.

FIG. 5 shows a section of the flexible drill string 22. The string 22 can be of any desired length, and the elongated members 42 are shown in a torqued or dynamic configuration as may be expected while drilling with the bit 24 under a load while making hole. The flexible drill string is provided with an upper male connector 58 and a lower female connector 56, respectively, at opposed ends, respectively, thereof. The connectors 56 and 58 are threadedly made up with the connectors or subs 26 and 28 of FIG. 1, for example.

In FIG. 6, the connector 58 has circumferentially extending sockets 84 of a size to properly receive the marginal ends of the cables 42 snugly anchored therein in a manner such that the connector can transfer tension as well as torque between the string 20 and the bit 24.

In FIG. 7, the connector 56 has an end 80 that confronts end 82 of connector 58. Each of the connectors 56, 58 has cable receiving sockets 84 within which the opposed marginal terminal ends of each of the cables 42 are suitably anchored. In FIG. 7, threaded surface 86 is spaced from ring 88 and provides a means for anchoring the marginal end of the flow conduit 40 therein with the conduit being tightly received within chamber 90. Threaded female end 92 can be made up with standard subs, connectors, and the like.

The lower face 94 of connector 56 is in the form of a shoulder for abutting the similar shoulder formed on the connector 58 of an adjacent section of flexible drill string 22.

FIG. 8 sets forth an alternate embodiment 110 of the flexible drill string guide. A tightly wound outer housing 118 (shown herein as being loosely wound for illustrative purposes) guidably receives the flexible drill string 22 therein in the before described manner of the other Figures of the drawings.

Where deemed desirable to do so, the flexible drill guide 118 can be substituted for the drill guide or casing 18 of FIG. 1. The flexible drill guide 118 can also be made of a suitable size to be placed about the flexible drill string 22 and within another and larger flexible casing in order to reduce the effective annular area therebetween.

For example, a small diameter 4½ inch casing should suitably receive a 3¾ inch diameter flexible drill string 22 made in accordance with this invention therein. Such a drill string should have the heretofore unknown and unexpected advantage of forming a curve having a 12 foot radius R or less.

However, where the casing, or combination casing and guide means, is much larger than the flexible drill string 22, the guide means of FIG. 8 can be advantageously employed in the before described manner to reduce the effective size of the annulus therebetween. This unexpected advantage allows the tolerance between the casing interior and the outer surface of the flexible drill string to be reduced to a desired value.

It is believed the present invention is of particular value in that conventional drilling equipment and methods can be used in conjunction therewith, and the need for special and costly equipment, other than that disclosed herein, is greatly reduced. The present invention can work in small diameter casing such as 4½ inch diameter and this also reduces the cost of forming the lateral extension of both new and old boreholes.

We claim:

1. A flexible tool string for curving a vertical borehole laterally towards the horizontal, comprising, in combination:

an elongated flexible casing string having a longitudinal central axis that can bend to conform to a segment of a curve; a connector by which said flexible casing string can be attached to a relatively inflexible casing string;

an elongated flexible drill string rotatably received within said flexible casing string with there being an annulus formed between the flexible casing string and flexible drill string;

said flexible drill string has a central fluid conveying conduit made of resilient material, said central fluid conveying conduit is surrounded by a plurality of longitudinally extending elongated flexible members that jointly encapsulate said central fluid conveying conduit and forms an outer elongated housing for the flexible drill string;

a connector at opposed ends of said flexible drill string by which one end of said flexible drill string can be attached to a relatively inflexible drill string which can impart rotation into said flexible drill string;

said central fluid conveying conduit is an elastomeric conduit and said plurality of flexible members are circumferentially arranged thereabout on a common circle and are connected together at spaced intervals to form the outer elongated housing;

and a drill bit attached to a connector at the other end of said flexible drill string for penetrating a formation when rotated by said flexible drill string.

2. The combination of claim 1 wherein said elongated flexible members are individual cables spaced at equal radial distances from the longitudinal central axis of the fluid conveying conduit and further including a fastener means by which said cables are connected together at spaced intervals along the length thereof to form said outer elongated housing.

3. The combination of claim 1 wherein said elongated flexible members are joined together by an elastomer that also forms said fluid conveying conduit.

4. The combination of claim 1 wherein said central fluid conveying conduit is made of an elastomeric material and said plurality of elongated flexible members are circumferentially arranged equidistant thereabout; and fastener means by which adjacent elongated flexible members are connected together at spaced intervals along the length thereof to form the outer housing:

said elongated flexible members are individual cables spaced at equal radial distances from the longitudinal central axis of the fluid conveying conduit; said connector is an annular body having circumferentially extending sockets within which a marginal end of said cables are anchored.

5. In a flexible tool string apparatus for drilling a crooked borehole, the improvement comprising:

a flexible casing adapted to be curved to conform to a predetermined curve that interconnects a vertical length of a borehole and lateral length of a borehole together;

a flexible drill string received within said flexible casing; said flexible drill string includes an inner flexible flow conduit about which there is disposed a flexible housing, said flexible housing comprising a plurality of elongated load transferring members circumferentially disposed about said inner flexible flow conduit;

means connecting said load transferring members together to form said flexible housing about said inner flexible flow conduit;

lower connector means for connecting a bit to one end of said flexible drill string, and upper connector means by which the other end of said flexible drill string can be attached to an end of a relatively rigid drill string for imparting rotation into a bit when the relatively rigid drill string is rotated;

said inner flexible flow conduit is an elastomeric conduit, and said plurality of load transferring members are circumferentially arranged thereabout and are connected together by the elastomer that forms said elastomeric conduit to thereby hold the elongated load transferring members together and form the flexible housing.

6. The improvement of claim 5 wherein said elongated load transferring members are individual cables spaced equal radial distance from the longitudinal axis of the inner flexible flow conduit and further including means connecting said cables together into said flexible housing; said upper and lower connector means is an annular body having circumferentially extending sockets within which a marginal end of said cable is anchored;

said flexible casing having segments and a longitudinal central axis that can bend to form a curve; means hingedly attaching the segments together such that the segments jointly bend into a radius of curvature required for the vertical length of the borehole to be turned laterally.

7. The improvement of claim 5 wherein said flexible elongated load transferring members are joined together by the elastomer that also forms said inner flow conduit.

8. Apparatus for drilling a crooked borehole, comprising:

a flexible outer conduit adapted to be curved to conform to a vertical borehole that is curved into a lateral borehole;

a flexible drill string received within said flexible outer conduit; said flexible drill string has an upper end opposed to a lower end and includes an inner flexible conduit having a flow passageway therein about which there is disposed an outer flexible housing comprising a plurality of elongated load transferring bendable members circumferentially disposed about said inner flexible conduit;

means connecting said load transferring bendable members together to form said outer flexible housing about said inner flexible conduit;

lower connector means for connecting a bit to said lower end of said flexible drill string; upper connector means by which the upper end of the flexible drill string can be attached to the lower end of a relatively rigid drill string; and means for rotating the relatively rigid drill string to impart rotation into the flexible drill string;

said inner flexible conduit has a central passageway and is made of an elastomeric material, and said plurality of load bearing bendable members are circumferentially arranged thereabout and are connected together by the elastomeric material that forms said inner flexible conduit to thereby hold the bendable members together and form the outer flexible housing.

9. The apparatus of claim 8 wherein said elongated load transferring bendable members are individual cables placed closely adjacent to one another and spaced an equal radial distance from the longitudinal axis of the flow passageway, and further including means connecting said cables together into said outer flexible housing; said upper and lower connector means is an annular body having circumferentially extending sockets within which a marginal end of said cable is anchored.

10. Method of drilling a borehole having an upper vertical length that is curved into a lower lateral length; comprising the steps of:

1. forming said vertical length of said borehole with a relatively inflexible drill string that is rotatably received within a relatively inflexible casing string;
2. curving the lower end of said vertical length of said borehole into a lateral length by:
    a. connecting a relatively flexible drill string to the lower end of the relatively inflexible drill string and connecting a relatively flexible casing string to the lower end of the relatively inflexible casing string;
    b. attaching a bit to the terminal end of said relatively flexible drill string;
    c. diverting the bit from the vertical borehole to form a lateral borehole while rotating the bit of imparting rotation into said inflexible drill string;
    d. surrounding said flexible drill string with said flexible casing which comprises a spiral; and
    e. making said flexible casing into a spiral which extends from a casing connector at a lower end thereof to a casing connector at an upper end thereof and which can bend into a radius of curvature required for the vertical part of the borehole to be turned laterally;
    f. using said flexible casing downhole in the lateral borehole to subsequently produce the formation through the flexible casing, whereby fluid flows from the formation, into the flexible casing, and uphole to the surface of the ground.

11. Method of drilling a borehole having an upper vertical length that is curved into a lower lateral length; comprising the steps of:

1. forming said vertical length of said borehole with a relatively inflexible drill string;
2. curving the lower end of said vertical length of said borehole into a lateral length by:
    a. connecting a relatively flexible drill string to the lower end of the inflexible drill string;
    b. attaching a bit to the terminal end of said flexible drill string;
    c. diverting the bit from the vertical borehole to form a lateral borehole;
    d. surrounding the flexible drill string with a flexible casing;
    e. making said flexible casing into segments;
    f. hingedly attaching the segments together such that the segments jointly bend into a radius of curvature required for the vertical part of the borehole to be turned laterally; and, g. leaving said flexible casing downhole in the lateral borehole and subsequently producing the formation through the casing.

12. The method of claim 11 and further including the steps of:

making said flexible drill string with a central fluid conveying conduit made of resilient material surrounded by a plurality of longitudinally extending elongated flexible members that jointly encapsulate said central fluid conduit and forms an outer bendable housing for the drill string.

13. The method of claim 12 and further including the steps of:

making said longitudinally extending elongated flexible members joined together by an elastomer that also forms said central fluid conveying conduit.

* * * * *